3,557,200
NITRILOTRIACETIC ACID BASED CHELATING AGENTS

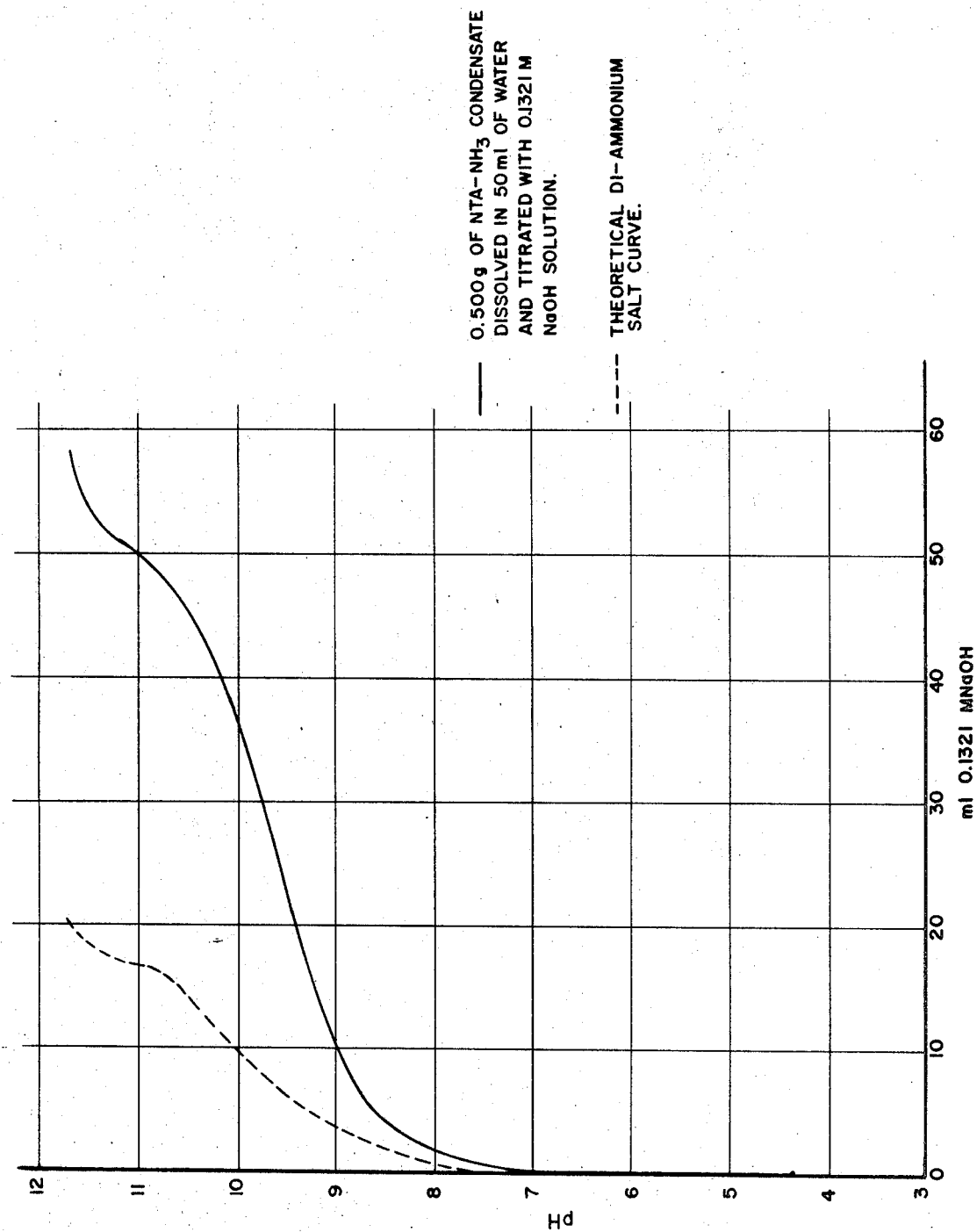

Frederick C. Bersworth, East Orange, N.J., assignor, by mesne assignments, to Frederick C. Bersworth, East Orange, N.J.
Continuation-in-part of applications Ser. No. 580,829, Sept. 20, 1966, now Patent No. 3,351,658, and Ser. No. 588,222, Oct. 20, 1966, which is a continuation-in-part of applications Ser. No. 88,604 and Ser. No. 88,606, both Feb. 13, 1961; Ser. No. 446,120, Apr. 6, 1965; and Ser. No. 468,182, June 4, 1965. This application Aug. 17, 1967, Ser. No. 661,367
Int. Cl. C07c *103/88*
U.S. Cl. 260—534                2 Claims

ABSTRACT OF THE DISCLOSURE

Chelating agents are prepared by reacting ammonia with nitrilotriacetic acid to form a condensation product which has chelating properties suitable for holding iron ions in aqueous solution over the complete temperature and pH range attainable in aqueous solution.

---

This invention relates to the preparation of novel chelating agents by the reaction of ammonia and aqueous ammonia at relatively high concentrations with nitrilotriacetic acid to form condensation products. This application is a continuation-in-part based on my earlier filed copending applications, Ser. Nos. 580,829, filed Sept. 20, 1966, now Pat. No. 3,351,658 and 588,222, filed Oct. 20, 1966, now abandoned, which, in turn, were continuations of Ser. Nos. 468,182, filed June 4, 1965; 446,120, filed Apr. 6, 1965; 88,604, filed Feb. 13, 1961 and 88,606, filed Feb. 13, 1961, all now abandoned.

BACKGROUND OF THE INVENTION

In the art of chelation, the polyamino polycarboxylic acids represent a type of synthetic amino acid chelating agent of very versatile nature, making these acids useful in a wide variety of applications. The objective in the preparation of any chelating agent is, of course, to have the material used as the chelating agent in a form which is stable, water soluble and rather quantitatively predictable in its ability to react in solution and to form the chelates it is sought to form. The test of a valuable chelating agent is that which has the capacity to chelate a difficult metal such as iron and hold it in solution under a wide variety of conditions, particularly alkaline conditions. The reason this can be used as a good test of a chelating agent is that iron is commonly present in water, or commonly finds its way into water, which in turn forms obnoxious yellowish and reddish-yellowish stains on white surfaces. Particularly will it stain materials such as cottons. In other words, in laundry applications, iron is a serious problem, because the solution is generally alkaline and the iron hydroxide which forms is somewhat substantive to cotton with the result that various discolorations can and do occur.

DETAILED DESCRIPTION OF THE INVENTION

This invention is concerned with a new composition of matter which is a reaction product of ammonia and nitrilotriacetic acid which, in view of its empirical composition and other properties to be described below, appears to be a diammonium salt of a condensation product of two moles of nitrilotriacetic acid and one mole of ammonia, so that it answers to the following formula:

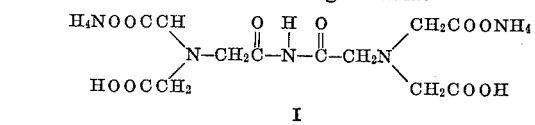

I

It is to be observed that the compound is a product formed directly by the reaction of nitrilotriacetic acid with a large excess of ammonia which can be used in aqueous form. Generally, I prefer to use ammonia in aqueous solution at about 15 molar concentration, at least, but lower concentrations would also be suitable. Upon contact with the nitrilotriacetic acid, a mild effervescence ensues and, with the heating of the solution, maintaining it at a temperature between 85–140° C., the condensation reaction proceeds to completion. Water and ammonia are removed under reduced pressure, such as that obtainable with a water aspirator, and in due time the reaction mixture yields a white solid of the NTA ammonia condensate. The solid is of quite reproducible composition, finely crystalline and based upon analyses has the composition of Formula I above. Titration with standard base is in agreement with what one would expect for the condensation of two moles of nitrilotriacetic acid with one mole of ammonia and the formation of two ammonium salt groups, as indicated by Formula I. Chelation tests indicate metal-binding activity near that of EDTA (rather than NTA), except that the affinity for Fe(III) is exceptionally high, indicating a unique structure. Infrared data further indicate the presence of an imide structure in the molecule which can be accounted for only on the basis of the condensation product indicated above. The infrared spectrograms were measured by the method commonly used for identifying compounds consisting of the use of a standard infrared recording spectrophotometer, and involving an oil mull of the compound being studied.

Thus, the method of preparation is the direct reaction of nitrilotriacetic acid with excess of ammonia. Generally, I use about 10 moles per mole of NTA, but, based upon the concentrations used and other conditions the excess may be greater or less than this. A ratio of 3 moles of NH₃ to NTA is also quite effective in producing the desired product. The mixture is heated at a temperature between 85° and 140° C. to bring about the completion of formation of the solid and condensation product.

In the drawings:
FIG. 1 is a titration curve for the product when it has been dissolved in water and titrated with standard base.

EXAMPLE I

Solid nitrilotriacetic acid is placed in a reaction vessel and dissolved in aqueous ammonia. Generally, I prefer to use 15 molar ammonia using about 40 weight parts of the aqueous ammonia per 5 parts by weight of the nitrilotriacetic acid. The solution formed, or reaction mixture, is promptly heated to a temperature in the range from about 85° to 100° C. Generally, for obtaining a condensation product which is most effective, I prefer to operate at temperatures of about 120 to 130° C. for completing the reaction. However, temperatures as low as 85° are operative. The difference between operating at the lower temperature and the higher temperature is simply in the length of time required for completing the formation of the product.

The product is formed when the solution is carried to dryness at the stated temperature. Whether carried to dryness under reduced pressure, or atmospheric pressure, the same product is obtained.

It is possible on the basis of analysis, infrered spectra, and titration data to ascribe Formula I to the compound formed.

By evacuating the reaction vessel in which the product is formed, heating and drying, it is possible to recover the ammonia and water from the reaction mixture.

It will be seen that the composition herein corresponds to a diammonium salt, and it contains nitrogens and carboxylate groups spaced from each other in such a manner as to present great possibilities for the formation of stable chelates, chelates of metal ions. The anion of this compound, obtained by the addition of two equivalents of base (to produce the diammonium disodium salt) would have the following structure:

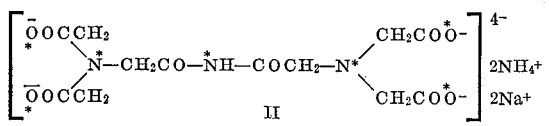

This compound has a tetranegative charge and seven strong coordinating groups, four negative carboxylate groups and three neutral nitrogen atoms. This chelating agent is thus septadentate and has high affinity for metal ions such as alkaline earths, the rare earths, and the transition metal ions.

Compound II may be converted to the tetrasodium salt by warming (in solution) with two additional equivalents of base and evaporating to dryness to prdouce a colorless crystalline compound.

EXAMPLE II

Using a somewhat different technique than that described in Example I, nitrilotriacetic acid is reacted with liquid ammonia. This, of course, requires a closed system. Since reaction is conducted in the liquid ammonia and liquid ammonia is a dehydrating agent, this technique creates more favorable conditions for the condensation reaction. The reaction proceeds substantially as follows:

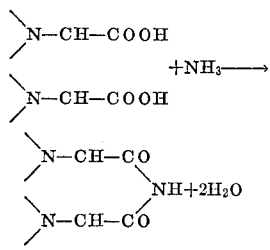

The liquid ammonia, of course, is very volatile and by pumping a slight vacuum in the reaction zone, or merely allowing it to warm up to room temperature, the ammonia is removed and a residue of an ammonia condensation product with NTA is left.

The reaction product by analysis is close to that of the diammonium salt of NTA, but the data from potentiometric titration, as well as the analysis, indicate a higher ammonium salt (higher nitrogen content) than the structure indicated by Formula I.

Apparently the mechanism by which the product is formed may be through the ammonium salt and it is possible to postulate a mechanism under which the ammonium salt, either the mono to the tri salt or any mixture thereof, is that through which the composition passes in torming the ultimate amide.

EXAMPLE III

The ammonium salt corresponding to approximately the 1½ salt of nitrilotriacetic acid, that is, a mixture of the mono and diammonium salt was enclosed in a reaction chamber and heated at a temperature in the range from 120° C. to 140° C., in this instance at a temperature of about 135° C., and when no further ammonia or water vapor appeared to be given off, allowed the mass to cool. The formation of the product which corresponded in its properties with that of Example I was confirmed, that is, a product having the formulation which could be considered the diammonium salt of the monoamide of two moles of nitrilotriacetic acid.

EXAMPLE IV

Again following the technique of Example 3 prepare a mixture consisting of the diammonium salt and nitrilotriacetic acid and by reacting it with concentrated ammonia make an approximation of the triammonium salt which upon heating at a temperature of 130° C. until completion of evolution of water and ammonia give rise to the formation of a product which is the diammonium salt of the monoamide of two moles of nitrilotriacetic acid. That is, the composition essentially corresponding to Example I is produced.

EXAMPLE V

In foregoing examples, for presentation and tracing of the reaction acid forms of nitrilotriacetic acid were used. This simplifies the consideration. However, it should be understood that the condensation reaction described herein occurs with any acid form of nitrilotriacetic acid, meaning the monoacid disodium salt, or diammonium salt, or dipotasium salt, or the di-acid monosodium salt, or the monoammonium salts, or the monopotasium salt. In view of the fact that a reaction occurs with a carboxylic acid group condensing with another through the ammonium radial as postulated, the mono and di acid salts are quire as useful for the formation of the compounds as is the tri acid form of NTA itself. In fact, for manipulative purposes, it may be said the alkali metal salts have some advantage in that they have generally higher melting points.

The mechanism of the reaction is, of course, obscure, but it appears to involve the carboxylic group of nitrilotriacetic acid, which reactant preferably is one having a pH in the range of about 3 to 5. This generally includes the mono and disodium, potassium, and ammonium salts. Qualitatively at least it appears that the sodium salts aid in the formation of the amide. That is, reaction carried out with the monosodium and disodium salts appears to lead more quickly and cleanly to the formation of a completely reproducible reaction product.

Thus, returning to any one of Examples I or IV, as the nitrilotriacetic acid reactant therein it is possible to substitute the mono-sodium salt, disodium salt, or the mono-potasium salt, or the dipotasium salt and to carry out the processing involving reaction with ammonia in exactly the same way using the same temperature ranges. The elimination of water occurs and the residue obtained is a quite well defined reaction product, the sodium salt of the imide condensation product of two mols of the starting material with one made of ammonia through the carboxyl groups.

EXAMPLE VI

The compounds formed by any one of the Examples I through V have their use directly as such for incorporation into compositions such as washing compositions where they function to chelate heavy metal ions and therefore serve to help chemically deionize a solution, or at least convert the heavy metal ions in the solution to a non-reactive form.

The inverse usefulness of these compositions is in preparing preformed heavy metal chelates which, by virtue of the fact that they ionize only very slightly, and usually insufficiently to allow precipitation of the heavy metal ion by ordinary means, present the possibility of using these heavy metal chelates in this prepared form, as reservoirs of metal ions where they are needed. Thus, the chelating composition is useful for providing a reservoir of heavy metal in the medium where this may be desired. Medicinally, it is possible to prepare the iron chelate and administer iron to a biological system by means of these chelate compounds.

For example, the iron chelate of the NTA-ammonia amide condensation product is formed by reaction of one mole of an iron salt, chloride or sulfate, with the chelate composition. If it is desired to make the iron chelate quite pure it is possible first to precipitate the iron hydroxide, purify it by washing to remove all extraneous salts, such as the sodium chloride, as will be formed by precipitating the iron hydroxide from ferric chloride using sodium hydroxide, and, thereafter, dissolving the pure freshly prepared iron hydroxide in the chelating composition, in preferably its acid form. A direct neutralization type reaction occurs and the iron chelate can thereafter be recovered by evaporation. Iron is chelated in a direct 1:1 mole ratio, i.e., one molar weight of iron to one mole of the chelating product of this invention.

An alternative method is, of course, to use the acid form of the chelating composition in aqueous solution, contact it with iron dust, or iron oxide, thereby to allow it to take up as much of the iron as will react with the material and thus form the iron chelate which is thereafter separated by evaporation of the solution to form the dry product. Here too a 1:1 iron chelate forms.

The iron chelate formed in this fashion is quite useful as an additive to soil directly as the iron chelate, or in any kind of solid or liquid carrier-diluent. For example, the iron chelate diluted with diatomaceous earth or fertilizer compositions or the like can be used for the addition of iron to the soil.

In the same fashion, any other trace metals such as zinc, manganese, cobalt, nickel, and the like can be reacted in salt or hydroxide forms with the chelating compositions to form the chelate complexes and, thereafter, the complexes can be separated as solid, or can be directly added to soil or soil additive compositions as a solution.

The chelating agent itself in free form can be added to soil where it will react with metal oxides, etc. and render the metals soluble and available to plants.

EXAMPLE VII

The condensation product is also formed directly from the ammonium salts. Actually, when the NTA acid is reacted with ammonia the mechanism can be postulated as passing through the ammonium salt and, thereafter, to the condensate form. However, by starting with the diammonium salt, or a mixture of diammonium and monoammonium salt, to correspond to as little as the 1½ ammonium salt and heating the salt in its dry form, the condensation can be induced to occur. The measure of the completion of the reaction is when at a temperature of about 100° stability is achieved in that no water is being expelled.

Similarly, if the triammonium salt can be formed, and the only conditions under which I visualize it as being formed is when anhydrous ammonia is reacted with the solid nitrilotriacetic acid, the heating of the triammonium salt can also lead to the formation of the condensation product in accordance with this reaction.

It should be apparent that the formation of the compounds therefore can be accomplished by starting with the ammonia salts or any ammonium salts as low as the 1½ salt of nitrilotriacetic acid heating, etc. to obtain the amide condensation product.

That is, it is possible to commence preparation of the condensation product with any salt of ammonia which approximates the diammonium salt of nitrilotriacetic acid. I have established or identified the composition corresponding approximately to the 1.5 salt of ammonia and nitrilotriacetic acid as the level at which the composition carries sufficient nitrogen to be converted to the amide form in the diammonium salt form postulated as the structure corresponding to the composition and properties found for the composition of Example I.

It is unusual to observe the formation of an amide under the mild conditions used above. Apparently, the excess of ammonia and the strong dehydrating conditions achieved by liquid ammonia can move the reaction to the amide form outlined herein.

Reference to the drawings herein will indicate that they are graphs of titration of the NTA-ammonia condensation product prepared at 120° C.

Referring now to FIG. 1, the graph of the titration of one half gram of the NTA-ammonia condensate prepared at 120° C. shows that the titration curve begins in the middle of a steep inflection, quite similar to that which is obtained with the disodium salt of NTA or the diammonium salt of NTA. It should be noted, however, that a second inflection occurs after the addition of 49.5 milliliters of 0.1321 molar NaOH solution. From this, we obtain an equivalent weight of 76.5 based on the following formula:

$$\text{Equivalent weight} = \frac{\text{milligrams of sample}}{(\text{ml}_{\text{base}})(\text{molarity}_{\text{base}})}$$

If this were the simple diammonium salt of NTA

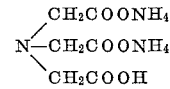

an equivalent weight of 225.4 would be expected or the second inflection would occur at 16.8 milliliters. This is the dotted line on the plot.

Based on this determination of the equivalent weight of the product, the molecular weight is some integral multiple of the equivalent weight, since we do not know the number of protons being titrated. That is, if the number is 1, the weight is 76.5; if it is 2, the weight is 153; if it is 3, the weight is 229.5, etc., or more generally:

Molecular weight=Equivalent weight×N when N is an integer.

The titration curves of the compound in the presence of metal ions are much like those of nitrilotriacetic acid and EDTA, until the pH of the solution reaches about 8.5 to 9.5. At this region, the potentiometric titration curve shows a long buffer region as contrasted to that of nitrilotriacetic acid. Also, we have found that the chelates, particularly those made with iron in ferric form, are stable in solution at high pH and at high temperature. That is, the iron chelate made on the 1:1 molar basis of metal ion to ligand remains in solution at pH levels up to 10.5 and the solution can be boiled without the precipitation of iron hydroxide.

It is important for any industrial chelating agent that it have good heat stability. In view of the fact that chelating agents are generally to be used in aqueous solution the important temperature range is any temperature up to that of the boiling point of water.

To test the heat stability of the product of this invention two solutions of the materials were prepared as follows:

(1) One tenth gram (0.10 gram) of NTA-ammonia condensate made in accordance with the process of this invention, corresponding to Formula I, and 0.050 gram of Fe(NO$_3$)$_3$·9H$_2$O were dissolved in 40 milliliters of water.

(2) One tenth gram (0.10 gram) of nitrilotriacetic acid and 0.050 gram of Fe(NO$_3$)$_3$·9H$_2$O in 40 milliliters of water.

Both solutions, Nos. 1 and 2, were then adjusted to pH 9 using sodium hydroxide solution. It is important for comparison purposes to be sure that all NTA has dissolved and the pH has not exceeded 9 during the addition of the base. If these points are not observed, the comparison is of no significance.

Then a sample of each solution, 10 to 15 milliliters, is taken in separate test tubes. Both solutions are heated to boiling and observed in their reactions to the heating process. A precipitate forms in test tube 2 that contains the simple nitrilotriacetic acid iron complex. It is decomposed by heating.

No precipitate is observed in the test tube 1 containing the Fe(III) complex of the condensate.

For the large scale production of the compounds in accordance with this invention, it should be noted that since the reaction is direct, the production of the compound can be reduced to almost an automatic or continuous basis. Thus, the two reactants must be brought together, given a few moments to react, brought to final finishing temperature and then introduced into a drying zone where they can be dried and heat cured, preferably under a vacuum. The preferred temperature for virtually quantitative conversion to the amide is about 120° C. under a typical water aspirated vacuum which will be about 100 millimeters of mercury. With temperatures as low as 85° C., the vacuum can also be quite effective in producing the products. It appears, therefore, that the basic necessity in the production of the compounds is, first, reaction, followed by a mild heating of the ammonia reaction product. This heating can be oven drying, drying under vacuum, or just generally heating of the ammonia salts as they are formed.

Equipment may be relatively simple and of a continuous type. Thus, treatment of the amino acids and ammonium salts is possible in equipment of standard form such that the NTA may be introduced with the ammonia in a section equipped with a screw conveyor and carried to a second section which is also heated and connected to a vacuum line for ammonia and water recovery, so that the salt is fed out to a dryer or drum. It is evident, of course, that all preheating should be held to a level well below the point of decomposition of the reaction product, or about 175° C.

The ammonia concentration may be virtually at any level, but, of course, it is uneconomic to use extremely large excess of ammonia. Generally, I find that 26% ammonia is perfectly acceptable and readily available. In commercial practice, where it is desired to produce large amounts of the condensation product, the ammonia concentration may be as high as 50 to 60%. The higher concentration will aid in the dehydration of the NTA ammonia reaction product, because the ammonia itself is a dehydrating agent at these elevated concentrations. Anhydrous ammonia is also useful as a reactant and, of course, is an effective dehydrating agent.

It is also possible to carry out the reaction under pressure rather than under vacuum. In such a system, the solid preheated amino acid is fed into the pressure vessel containing the ammonia reactant and the solids or highly concentrated solution are discharged from the bottom to enter the vacuum and drying system.

Analysis of the parameters governing the method of making the compound in accordance with this invention will demonstrate that the characterizing structure is formed by one or more salts of the residual carboxymethyl groups and the functional moiety produced in the condensation reaction is —CO—NH—CO— group.

While generally it is simplest to synthesize the compounds with an excess of ammonium hydroxide, it is sufficient to add ammonium hydroxide to the nitrilotriacetic acid to form a solution using only stoichiometrically equivalent molar amounts. The ammonium salts of NTA form a quite concentrated solution ranging from 40% to 50% and are quite mobile liquids even at this stage. Also, the boiling temperatures of such solutions range from 100 to 115° C.

The recovery of the reaction product of the condensation reaction can be accomplished by standard procedures and by vacuum evaporation; vacuum drying on drums; spray drying or tray drying, with or without vacuum. Generally, I prefer to use vacuum to insure uniformity of product and to prevent heat decomposition and also to make possible the removal, recovery and recycling of free ammonia and ammonium hydroxide. The ammonia concentration used may range from the conventional 26% ammonia to liquid ammonia. Generally, I find that the 40% to 60% ammonia solution is easily handled commercially and in that concentration functions as a dehydrating material. This, of course, is a virtue of the liquid ammonia, namely, that it functions as a dehydrating agent and effects rapid condensation of the ammonium salts.

Where the material is prepared with pure nitrilotriacetic acid in ammonia there is no need for purification of the product. If purification is desired, it is carried out by dissolving the condensation product in methanol and precipitating the soluble salts. When the fraction which is dissolved in methanol and recovered therefrom is obtained it is established that it is the new compound per se. Nitrilotriacetic acid as such is not soluble in ethanol. The simple ammonium salts of nitrilotriacetic acid are also not soluble in methanol. Hence technique or preparing a very pure condensation product corresponding to this invention involves dissolving the reaction product in hot methanol, removing any undissolved matter, and then recovering that which is dissolved by slow evaporation and drying. This results in separation of pure crystals of the compound. Generally, it is not absolutely essential to prepare the reaction product in pure form because it is quite effective as a chelating agent as a reaction product, wherein it may be assumed a mixture of the condensation product and a small percentage of ammonium salts of nitrilotriacetic acid are present.

It should be apparent that, as reactants in the process, salts which yield ammonia or compounds which yield ammonia may be used as a source of ammonia for reaction with the NTA.

The reaction products obtained by evaporating nitrilotriacetic acid with ammonia, or with any source of ammonia 120° C.–130° C. in a vacuum, are more effective chelating agents than pure nitrilotriacetic acid or the simple ammonium salts of NTA prepared at ambient temperatures. The preparations are directly reproducible and the chelating properties of the products are consistently superior for standard formulations.

The empirical composition of the preparations corresponds approximately to the diammonium salt of nitrilotriacetic acid. Elemental analysis for carbon, hydrogen and nitrogen does not indicate the true structure, or, for example, differentiate the hydrate of the imide I from an ammonium salt of nitrilotriacetic acid containing the same number of nitrogen atoms. However, the existence of products other than ammonium salts is amply confirmed by the titration and chelating properties of the composition and the infrared spectra. Possible compositions are molecules such as the tri and tetraammonium salts of the imide obtained from two molecules of nitrilotriacetic acid and one of ammonia. These may be outlined as follows:

Tetraammonium salt

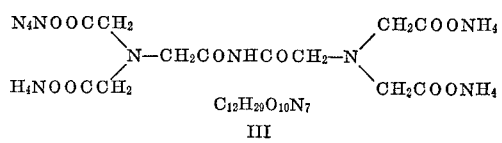

III

Triammonium salt

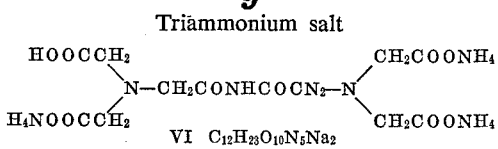

Also the mono and diammonium salts of NTA monoimide are possible.

Monoammonium salt

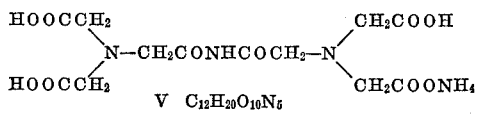

Disodium salt

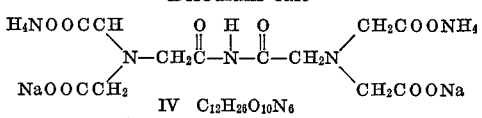

The calculated hydrogen, carbon, and nitrogen values for the compounds listed as compared with the analytical values of the elemental compositions of the reaction product do not give basis for positive conclusions.

Analysis of product per invention: C, 38.2; H, 5.88; N, 17.32.

Comparison of these figures with theoretical values for the formula projected indicates the experimental error is too great to permit precise assignment of definitive formula on these data.

The following analytical procedure is satisfactory and demonstrates the presence of imide products in the NTA preparations using ammonia.

Method of analysis

The product is dissolved in water, acidified to pH of 2–3 with dilute hydrochloric acid, cooled to 10° C. and the precipitate of mainly NTA imide and NTA is collected on a fritted filter and washed well with cold water until the filtrates are free of chloride ion (Ag+ test). At this point the residue should be washed free of free ammonia or ammonium chloride and contains NTA and NTA derivatives. A portion is vacuum dried at 75° C. and analyzed for amide and imide nitrogen by a combination of the Van Slyke Method and modified alkaline hydrolysis. The Van Slyke determination gives a measure of amide ($CONH_2$) nitrogen while the modified alkaline hydrolysis measures total amide ($CONH_2$) and imide (NH) nitrogen. Typical analytical results from several preparations are listed in the following table. For comparison purposes the data from NTA and pure diammonium NTA are also listed:

TABLE.—AMIDE AND IMIDE DETERMINATIONS

| Sample [a] | Percent nitrogen [a] Van Slyke (1) amide | Hydrolysis (2) | Imide (2–1) |
|---|---|---|---|
| NTA | 0 | 0 | 0 |
| NTA-diammonium salt | 0 | 0 | 0 |
| Product per invention Examples I–IV | 0.7 | 0.8 | 21 |
| Product per invention Examples I–IV | 1.0 | 1.1 | 21 |

[a] Nitrogen content in residue as $N_2$ (Van Slyke), an $NH_3$ (hydrolysis)

It is quite apparent that the reaction product is quite different from ammonium salts of NTA. There is present the new active agent which is mainly the ammonium salts of bis-NTA-imide.

With respect to the condensation product of NTA and ammonia in the presence and in the absence of the trivalent ferric ion it is clearly indicated that an amide or imide group is formed. This appears in the infrared spectrogram quite clearly.

The ferric chelate formed from such amide condensation product as NTA has the following projected structure which appears to be a novel compound hitherto unreported in the literature:

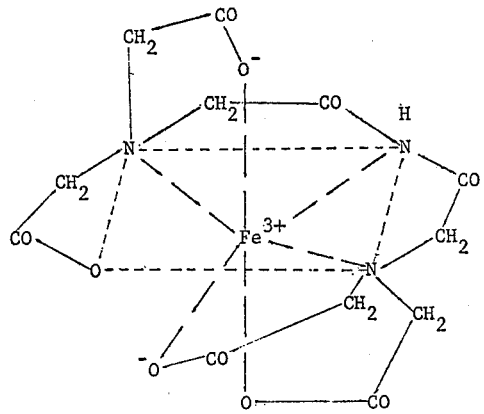

Thus this invention discloses new chelating agents (Formulas I–V), and new types of metal chelates prepared by combining metal ions with these chelating agents. Both the metal chelates and the chelating agents from which they are prepared are entirely new.

The condensation product is useful accordingly wherever chelate compounds are needed. An interesting application is in laundry operations where trace amounts of iron in water give problems of staining of fabrics. The presence of only a small amount of the chelating agents in the washing solutions which are generally somewhat alkaline is quite favorable for solubilizing the iron and not only preventing the precipitation of iron, but actually removing iron stains or existing iron stains from fabric.

In view of the stability of the iron chelate it can be prepared as a separate composition of matter for use as such wherever trace metals or traces of iron are needed in soluble form. Here agricultural applications suggest themselves immediately, that is, the NTA ammonia condensation product has an ample quantity in it and if subjected to degradation in soil will produce ammonia for utilization by plants in the soil. By the same token its stability as an iron chelate for carrying iron and solubilizing iron in the soil and making it available to plants renders the iron chelate exceptionally useful for incorporation into fertilizer compositions in whatever proportions may be desired. That is, the iron chelate can be applied directly to the soil as a dusting powder or incorporated in percentages ranging from a fraction of one percent, merely to provide a useful trace amount, or substantial percentages, to be used in fertilizers applied to soil through conventional spreading techniques. Any formulation of fertilizer is suitable as a carrier for iron in view of the stability of the iron chelate of the imide over a wide variation of pH levels.

What is claimed is:

1. The ammonium salt of nitrilotriacetic acid imide resulting from the direct reaction of nitrilotriacetic acid and ammonia in the amount of from about 3 to 10 moles of ammonia per mole of nitrilotriacetic acid at a temperature in the range from about 85–140° C. whereby said reaction mixture is maintained at said temperatures to evaporate water and free ammonia and to bring said reaction mixture to dryness and thereafter separating and recovering the reaction product.

2. The ammonium salt of nitrilotriacetic acid imide obtained by heating the 1½–3 ammonium salt of nitrilotriacetic acid at 120–140° C. to remove water and free ammonia and thereafter recovering the ammonium salt product.

References Cited

UNITED STATES PATENTS

| | | | |
|---|---|---|---|
| 2,993,918 | 7/1961 | Mannheimer | 260—534X |
| 3,024,277 | 3/1962 | Hotten | 260—534 |
| 3,351,658 | 11/1967 | Bersworth | 260—534 |

FOREIGN PATENTS

| | | | |
|---|---|---|---|
| 46,892 | 10/1939 | Netherlands | 260—534 |
| 1,061,325 | 7/1959 | Germany | 260—534 |

LORRAINE A. WEINBERGER, Primary Examiner

R. GERSTL, Assistant Examiner

U.S. Cl. X.R.

71—1, 27; 252—142, 152; 260—439